(12) United States Patent
Nakamura et al.

(10) Patent No.: US 12,526,499 B2
(45) Date of Patent: Jan. 13, 2026

(54) VEHICULAR CAMERA WITH ATTACHMENT JIG AND MANUFACTURING METHOD FOR THE SAME

(71) Applicant: Panasonic Automotive Systems Co., Ltd., Kanagawa (JP)

(72) Inventors: Ken Nakamura, Kanagawa (JP); Ryou Fukasawa, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 16 days.

(21) Appl. No.: 18/583,617

(22) Filed: Feb. 21, 2024

(65) Prior Publication Data

US 2024/0292077 A1    Aug. 29, 2024

(30) Foreign Application Priority Data

Feb. 24, 2023    (JP) .................................. 2023-027539

(51) Int. Cl.
*H04N 23/54* (2023.01)
*H04N 23/57* (2023.01)

(52) U.S. Cl.
CPC ............. *H04N 23/54* (2023.01); *H04N 23/57* (2023.01)

(58) Field of Classification Search
CPC .............................. H04N 23/54; H04N 23/57
See application file for complete search history.

(56) References Cited

U.S. PATENT DOCUMENTS

| | | | |
|---|---|---|---|
| 2020/0079450 A1 * | 3/2020 | Fischer | B62D 65/026 |
| 2021/0037172 A1 * | 2/2021 | Deng | H04N 23/55 |
| 2021/0304382 A1 * | 9/2021 | Lee | G06T 7/90 |

FOREIGN PATENT DOCUMENTS

| | | | | |
|---|---|---|---|---|
| EP | 3886431 A1 * | 9/2021 | | G06T 11/00 |
| JP | 2012101594 A * | 5/2012 | | |
| JP | 2019077400 A * | 5/2019 | | |

* cited by examiner

*Primary Examiner* — Richard A Hansell, Jr.
(74) *Attorney, Agent, or Firm* — Seed Intellectual Property Law Group LLP (57) ABSTRACT

A vehicular camera with an attachment jig includes a vehicular camera, and an attachment jig for attaching the vehicular camera to a vehicle body. The attachment jig is provided with a first screw hole through which a screw is able to pass, and the vehicular camera is provided with a second screw hole into which the screw is able to be screwed. The screw is configured to pass through the first screw hole and to be screwed into the second screw hole, and a thermosetting resin is present in a region between the first screw hole and the screw so as to be in contact with both the first screw hole and the screw.

3 Claims, 11 Drawing Sheets

VEHICULAR CAMERA WITH ATTACHMENT JIG AND MANUFACTURING METHOD FOR THE SAME

CROSS-REFERENCE TO RELATED APPLICATIONS

This application is based on and claims priority under 35 USC 119 from Japanese Patent Application No. 2023-027539 filed on Feb. 24, 2023, the contents of which are incorporated herein by reference.

TECHNICAL FIELD

The present disclosure relates to a vehicular camera with an attachment jig and a manufacturing method for the same.

BACKGROUND ART

In recent years, in response to demands for improvement in safety of a vehicle, introduction of an automated driving function, and the like, development of a vehicular camera that is mounted in a vehicle and images the inside and outside of the vehicle has become active. Generally, the vehicular camera is fixed to a vehicle body at a front portion, a rear portion, a side surface, or the like of the vehicle via an attachment jig such as a bracket (for example, see Patent Literature 1).

CITATION LIST

Patent Literature

Patent Literature 1: JP2019-077400A

SUMMARY OF INVENTION

The vehicular camera is required to be fixed to the vehicle body with high positioning accuracy due to a nature thereof. However, the vehicular camera and the attachment jig are integrated with each other by fastening members such as screws, and the positioning accuracy of the vehicular camera depends on a dimensional tolerance of the attachment jig. Therefore, there is a limit to the improvement of the positioning accuracy in the current method.

The present disclosure relates to a technique for providing a vehicular camera with an attachment jig for fixing the vehicular camera to a vehicle body with high positioning accuracy and a manufacturing method for the same.

The present disclosure provides a vehicular camera with an attachment jig. The vehicular camera with the attachment jig includes a vehicular, and an attachment jig that attaches the vehicular camera to a vehicle body. The attachment jig is provided with a first screw hole through which a screw is able to pass, the vehicular camera is provided with a second screw hole into which the screw is able to be screwed, the screw is configured to pass through the first screw hole and to be screwed into the second screw hole, and a thermosetting resin is present in a region between the first screw hole and the screw so as to be in contact with both the first screw hole and the screw.

Further, the present disclosure provides a manufacturing method for a vehicular camera with an attachment jig. The manufacturing method includes a temporary fixing step of temporarily fixing, by using a screw, a vehicular camera to an attachment jig for attaching the vehicular camera to a vehicle body; an optical axis adjustment step of adjusting an optical axis of the vehicular camera to a normal position; and a final fixing step of finally fixing the vehicular camera to the attachment jig by curing a thermosetting resin provided so as to be in contact with at least both the screw and a screw hole of the attachment jig.

According to the present disclosure, since the vehicular camera and the attachment jig are fixed to each other by the thermosetting resin, the vehicular camera and the attachment jig can be attached with high positioning accuracy, and as a result, the vehicular camera can be attached to the vehicle body with high positioning accuracy.

DESCRIPTION OF EMBODIMENTS

Hereinafter, embodiments that specifically disclose a vehicular camera with an attachment jig and a manufacturing method for the same according to the present disclosure will be described in detail with reference to the drawings as appropriate. However, unnecessarily detailed descriptions may be omitted. For example, a detailed description of well-known matters and a redundant description of substantially the same configuration may be omitted. This is to avoid unnecessary redundancy of the following description and to facilitate understanding of those skilled in the art. It should be noted that the accompanying drawings and the following description are provided for those skilled in the art to fully understand the present disclosure, and are not intended to limit the subject matter described in the claims.

Figure 1:
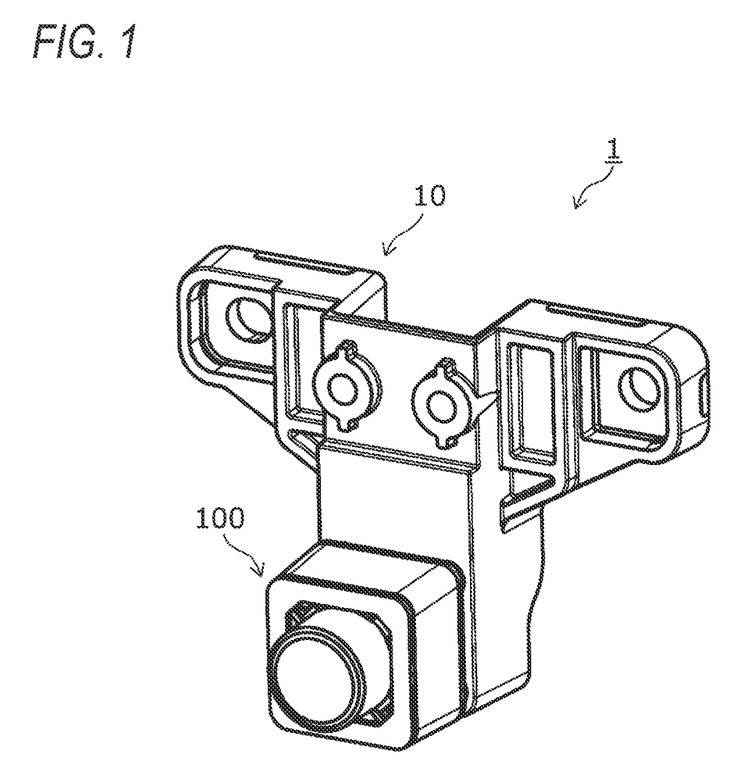
FIG. 1 is a perspective view of a vehicular camera with an attachment jig according to an embodiment.
Figure 2:
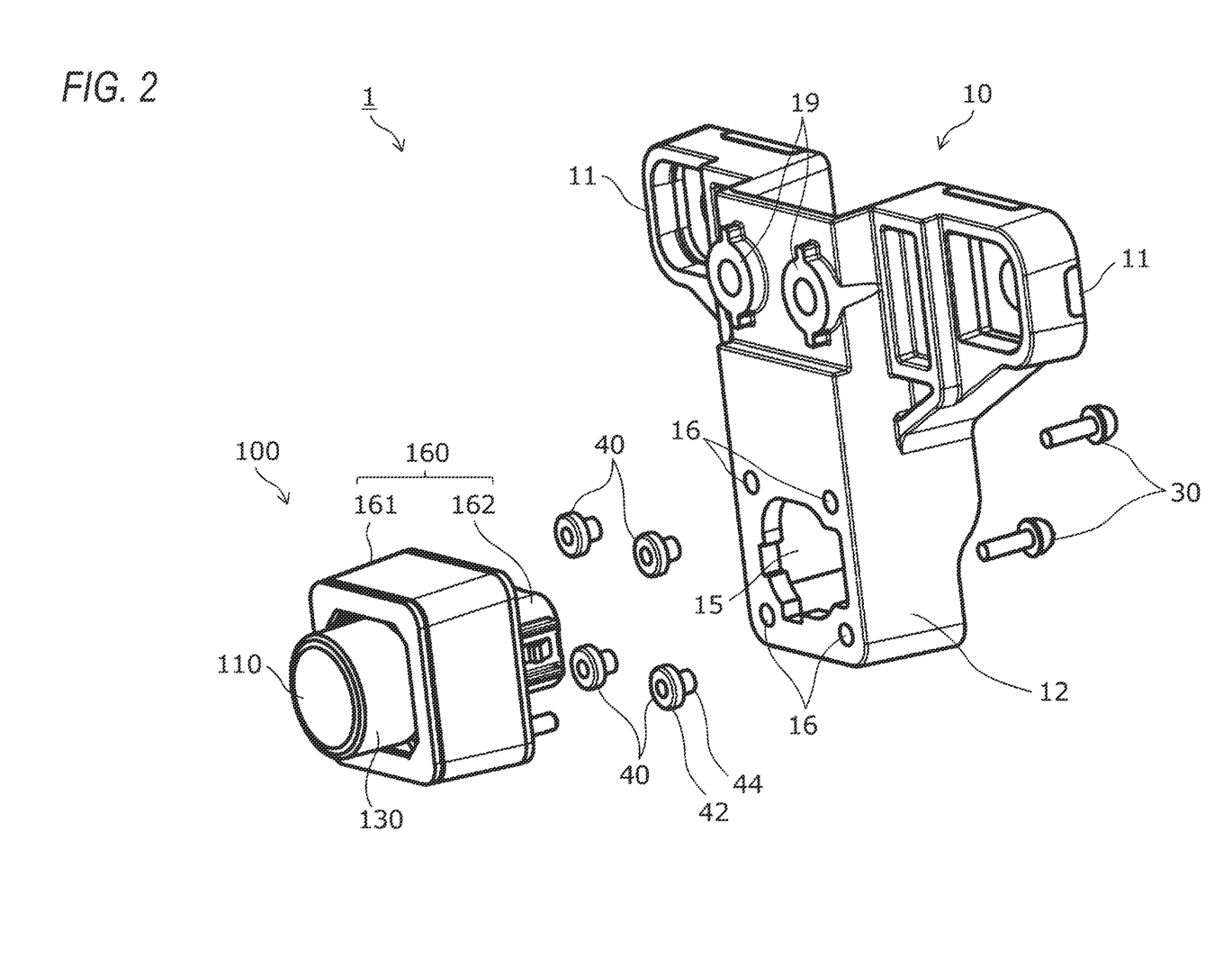
FIG. 2 is an exploded perspective view of the vehicular camera with the attachment jig according to the embodiment.
Figure 3:
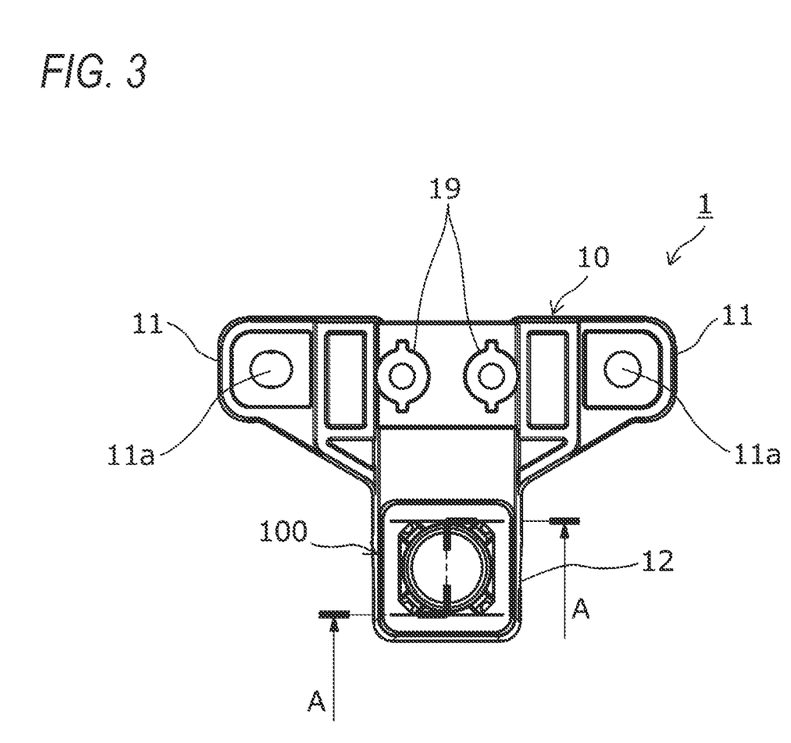
FIG. 3 is a front view of the vehicular camera with the attachment jig according to the embodiment.
Figure 4:
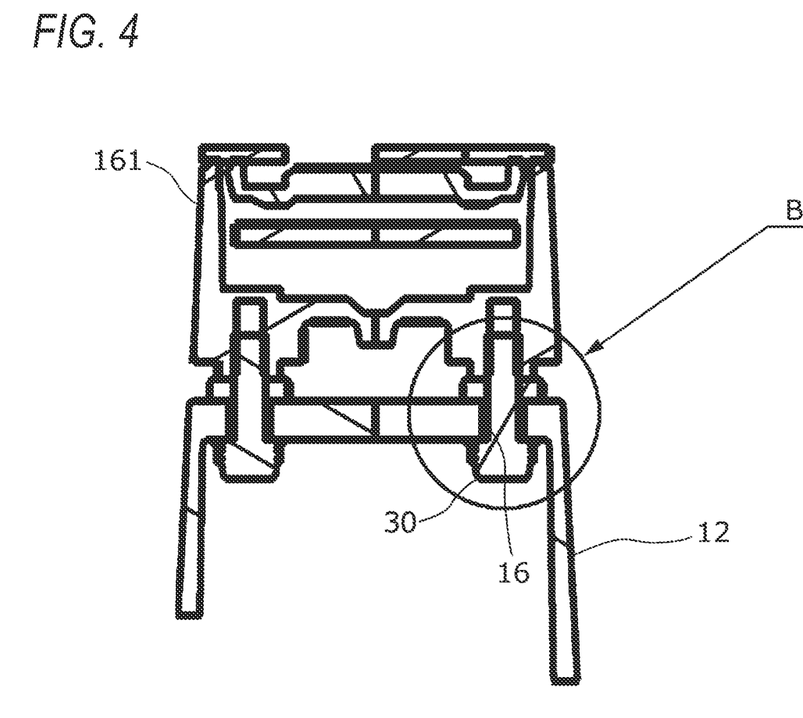
FIG. 4 is a cross-sectional view taken along line A-A of FIG. 3.
Figure 5:
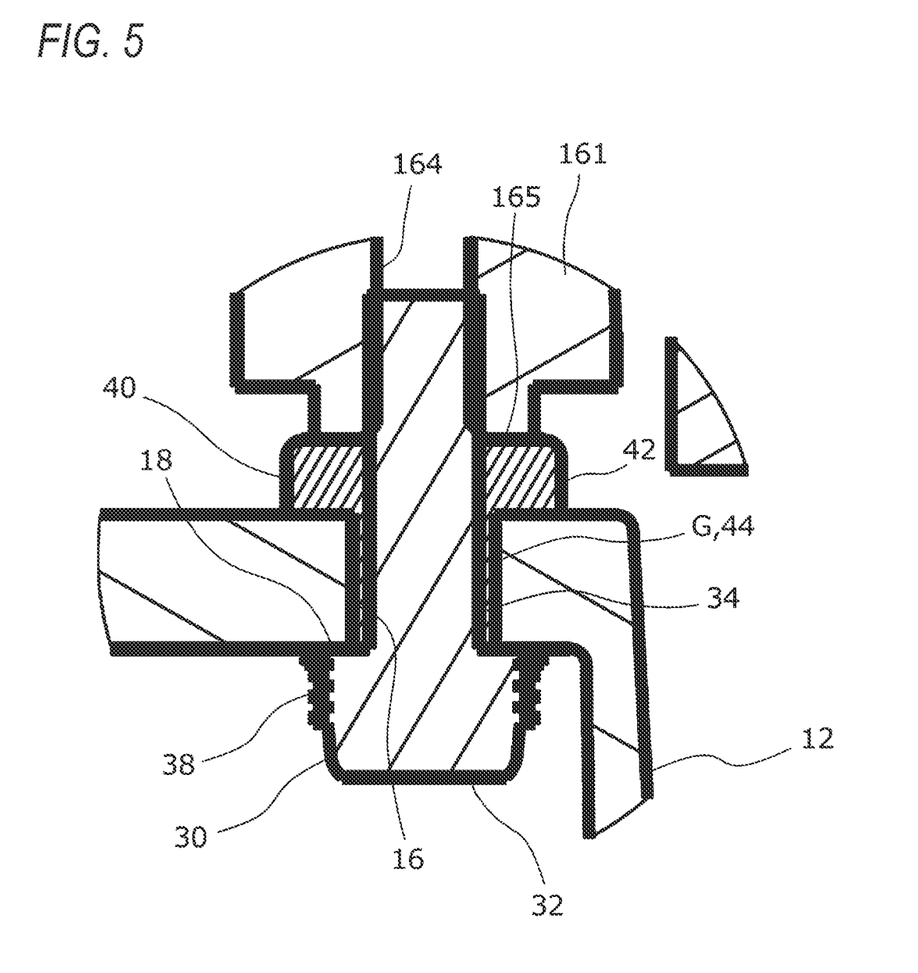
FIG. 5 is an enlarged view of a portion B in FIG. 4.

FIG. 1 is a perspective view of a vehicular camera with an attachment jig according to an embodiment. FIG. 2 is an exploded perspective view of the vehicular camera with the attachment jig according to the embodiment. FIG. 3 is a front view of the vehicular camera with the attachment jig according to the embodiment. FIG. 4 is a cross-sectional view taken along line A-A of FIG. 3. FIG. 5 is an enlarged view of a portion B in FIG. 4.

As shown in FIGS. 1 and 3, a vehicular camera with an attachment jig 1 according to the embodiment includes a vehicular camera 100 and an attachment jig 10 for attaching the vehicular camera 100 to a vehicle body. The vehicular camera 100 is fixed to the vehicle body at a front portion, a rear portion, a side surface, or the like of a vehicle via the attachment jig 10.

The vehicular camera 100 includes a lens 110, a lens barrel 130, and a housing 160. At least one lens 110 is arranged inside the lens barrel 130. A plurality of lenses 110 may be arranged inside lens barrel 130 with their optical axes aligned. The lens barrel 130 is formed of, for example, resin, and is attached to the housing 160 while holding the lens 110.

The housing 160 is a member that has an internal space and at least a part of which has a tubular shape, and includes a large-diameter tubular portion 161 and a small-diameter tubular portion 162. When viewed from a plane perpendicular to the optical axis of the lens 110, the large-diameter tubular portion 161 has a larger cross-sectional area than the small-diameter tubular portion 162 and has a rectangular cross section. However, specific shapes of the large-diameter tubular portion 161 and the small-diameter tubular portion 162 are not limited. The large-diameter tubular portion 161 accommodates an imaging element for converting light taken into the lens 110 into an image consisting of an electric signal, a circuit board on which an integrated circuit (not shown) for implementing various image processing performed by the vehicular camera 100 is mounted, and the like. The small-diameter tubular portion 162 mainly accommodates a connector that secures electrical connection with the outside of the vehicular camera 100 (for example, an electric control unit (ECU) as a control engine of the vehicle).

The attachment jig 10 is formed by integrally molding a pair of vehicle body side attachment portions 11 and a vehicular camera attachment portion 12. The vehicle body side attachment portion 11 is a portion attached to the vehicle body of the vehicle and has a shape like a tab extending in two directions from both side surfaces of the attachment jig 10. Each of the vehicle body side attachment portions 11 extending in two directions is provided with an attachment screw hole 11a (see FIG. 3) through which an attachment screw passes at the time of attaching to the vehicle body (see FIG. 11).

The vehicular camera attachment portion 12 is a portion to which the vehicular camera 100 is attached and has a vehicular camera through hole 15 through which a part of the vehicular camera, in particular, the small-diameter tubular portion 162 of the housing 160 passes.

The attachment jig 10 further includes a positioning portion 19 formed between the vehicle body side attachment portions 11 extending in two directions. The positioning portion 19 has a function of positioning the attachment jig 10 to an inspection jig for adjusting the optical axis of the vehicular camera 100. The positioning portion 19 will be described later in detail.

As shown in FIG. 2, in the attachment jig 10, a first screw hole 16 into which a spring screw 30 can be screwed is provided in the vehicle body side attachment portion 11. In the present embodiment, four first screw holes 16 are formed around the vehicular camera through hole 15.

As shown in FIG. 4, which is taken along line A-A of FIG. 3, the vehicular camera 100 and the attachment jig 10 are attached to each other by fastening the large-diameter tubular portion 161 of the vehicular camera 100 and the vehicular camera attachment portion 12 of the attachment jig 10 by the spring screw 30. It should be noted that FIG. 4 is a partial cross-sectional view taken along line A-A of FIG. 3 and does not show the lens barrel 130 and the like.

FIG. 5, which is an enlarged view of the portion B in FIG. 4, shows details of an attachment structure between the vehicular camera 100 and the attachment jig 10. The large-diameter tubular portion 161 of the vehicular camera 100 is provided with a second screw hole 164 through which the spring screw 30 can be screwed. When the vehicular camera 100 and the attachment jig 10 are assembled, the first screw hole 16 of the attachment jig 10 and the second screw hole 164 of the vehicular camera 100 are coaxially arranged. The spring screw 30 includes a head portion 32 and a shaft 34 extending from the head portion 32. The shaft 34 passes through the first screw hole 16, reaches the second screw hole 164, and is screwed into the second screw hole 164.

Further, the thermosetting resin 40 is disposed in a gap G formed between the first screw hole 16 and the shaft 34 of the spring screw 30 passing through the first screw hole 16. The thermosetting resin 40 is also disposed between the first screw hole 16 and the second screw hole 164.

In the present embodiment, the thermosetting resin 40 is provided, for example, as a solid component previously molded into a screw shape, as shown in FIG. 2. As shown in FIG. 5, the thermosetting resin 40 includes a circular flat plate portion 42 and a cylindrical tube portion 44 extending from the flat plate portion 42 and having a hollow center. Therefore, the tube portion 44 is disposed in the gap G, and the flat plate portion 42 is disposed between the first screw hole 16 and the second screw hole 164.

The shaft 34 of the spring screw 30 is screwed into the second screw hole 164 while passing through the first screw hole 16. In this state, the gap G is formed between the shaft 34 and the first screw hole 16. The thermosetting resin 40 is present in the gap G between the first screw hole 16 and the spring screw 30, more specifically, in the gap G between the first screw hole 16 and the shaft 34 of the spring screw 30 so as to be in contact with both the first screw hole 16 and the shaft 34 of the spring screw 30. As will be described later, the thermosetting resin 40 is cured by thermal curing in a manufacturing process, and functions as an adhesive that joins the first screw hole 16 and the shaft 34.

Thus, not only the spring screw 30 but also the thermosetting resin 40 adheres and firmly fixes the vehicular camera 100 and the attachment jig 10 to each other. Therefore, a positional deviation between the vehicular camera 100 and the attachment jig 10 is prevented, and thus the vehicular camera 100 and the attachment jig 10 can be attached with high positioning accuracy, and as a result, the vehicular camera 100 can be attached to the vehicle body with high positioning accuracy.

The spring screw 30 has a spring 38 (for example, a spring washer) adjacent to the head portion 32. In a state of FIG. 5, the spring 38 is in contact with a seating surface 18 around the first screw hole 16. Accordingly, since the spring 38 absorbs a positional deviation that may occur due to factors such as thermal expansion and aging after the vehicular camera 100 is attached to the vehicle body, the high positioning accuracy of the vehicular camera 100 can be maintained. However, the spring 38 is not an essential member, and a normal screw without a spring may be used instead of the spring screw 30.

As shown in FIG. 5, the thermosetting resin 40 is present over the entire gap G. Accordingly, the vehicular camera 100 and the attachment jig 10 can be firmly fixed to each other, and the vehicular camera 100 can be attached to the vehicle body with high positioning accuracy.

The thermosetting resin 40 is disposed between the first screw hole 16 and the second screw hole 164, also in contact with a peripheral region 165 of the second screw hole 164, and adheres to the large-diameter tubular portion 161 of the vehicular camera 100 and the attachment jig 10. Accordingly, the vehicular camera 100 and the attachment jig 10 can be more firmly fixed to each other, and the vehicular camera 100 can be attached to the vehicle body with high positioning accuracy.

Figure 6:
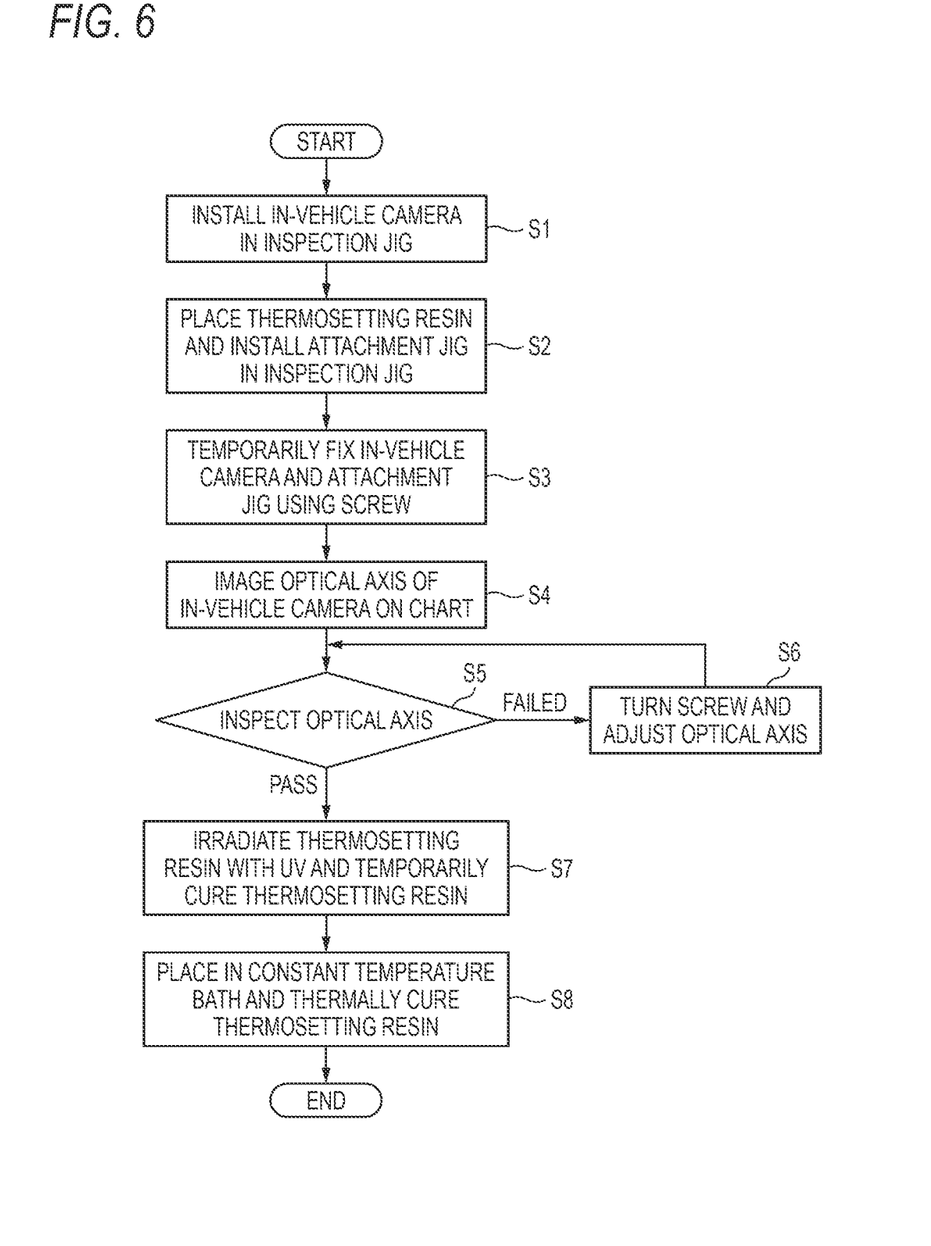
FIG. 6 is a flowchart showing a procedure for manufacturing the vehicular camera with the attachment jig.
Figure 7:
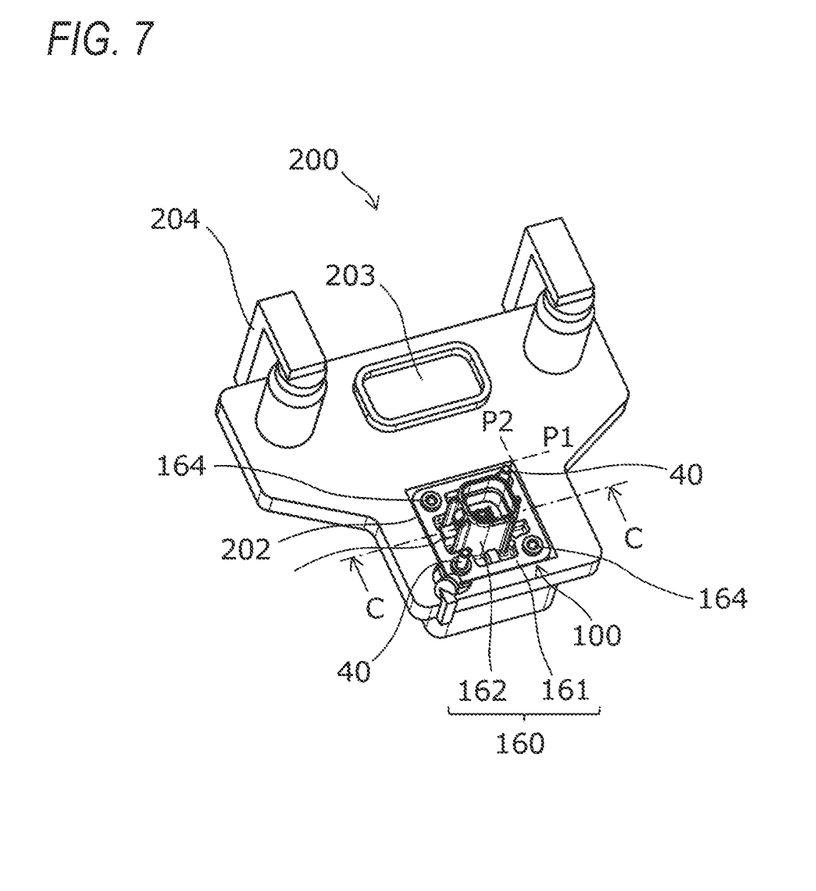
FIG. 7 is a perspective view of an inspection jig installed with the vehicular camera.
Figure 8:
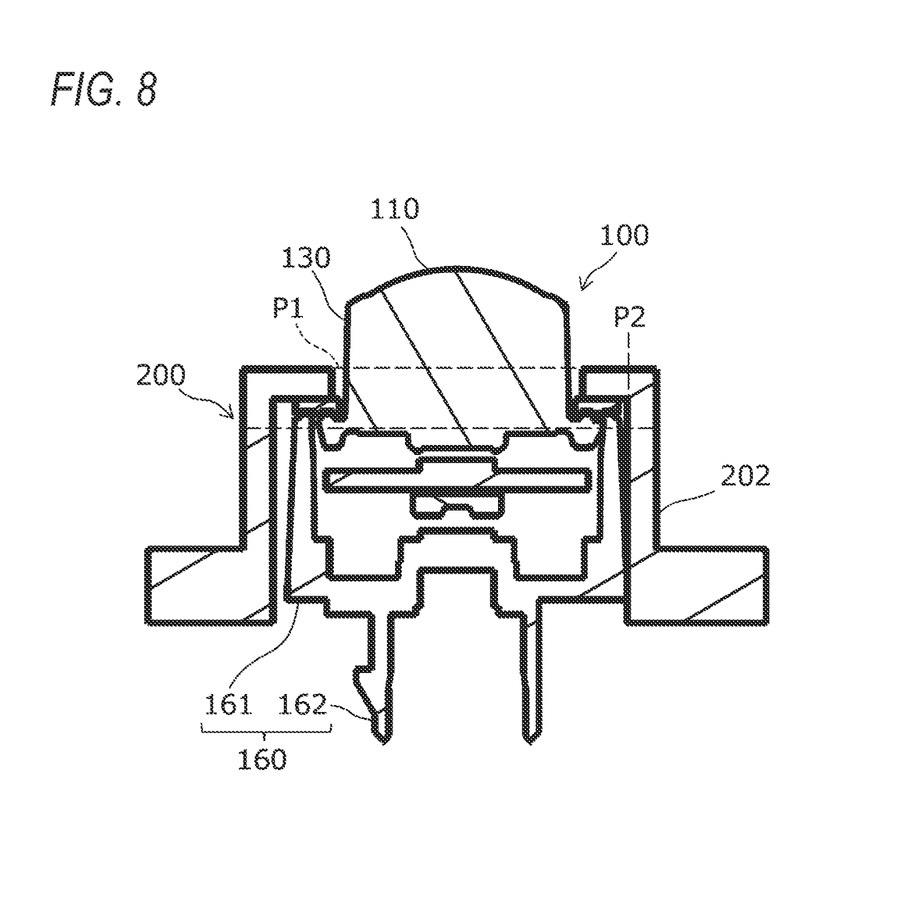
FIG. 8 is a cross-sectional view taken along line C-C of FIG. 7.
Figure 9:
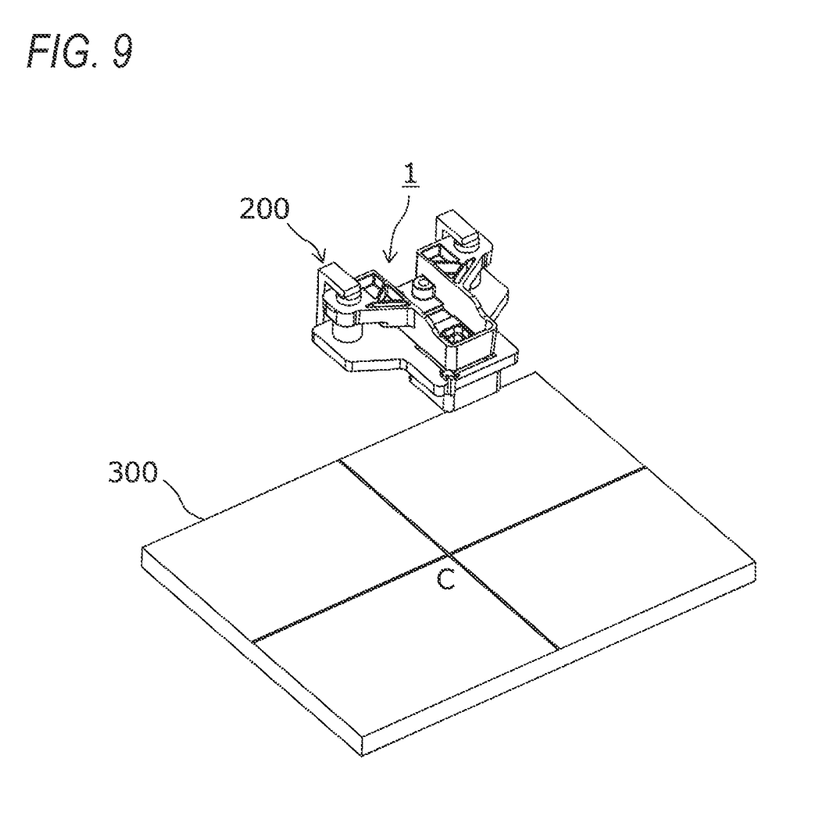
FIG. 9 is a diagram showing a state in which the vehicular camera according to the embodiment is inspected.

Next, a manufacturing method for the vehicular camera with the attachment jig 1 described above will be described with reference to FIGS. 6 to 9. FIG. 6 is a flowchart showing a procedure for manufacturing the vehicular camera with the attachment jig 1. FIG. 7 is a perspective view of an inspection jig 200 installed with the vehicular camera 100. FIG. 8 is a cross-sectional view taken along line C-C of FIG. 7. FIG. 9 is a diagram showing a state in which the vehicular camera 100 according to the embodiment is inspected.

In order to attach the vehicular camera 100 and the attachment jig 10 to each other with high positioning accuracy, it is necessary to guarantee the positioning accuracy of the vehicular camera 100 and the attachment jig 10 to a certain degree during manufacturing. The manufacturing method according to the present embodiment is a manufacturing method for the vehicular camera with the attachment jig 1 in which high positioning accuracy is guaranteed.

The manufacturing method according to the present embodiment is roughly divided into the following procedures. 1) A temporary fixing step of temporarily fixing the vehicular camera 100 to the attachment jig 10 using the spring screw 30; 2) an optical axis adjustment step of adjusting the optical axis of the vehicular camera 100 to a normal position; and (3) a final fixing step of finally fixing the vehicular camera 100 to the attachment jig 10 by curing the thermosetting resin 40 provided so as to be in contact with at least both the spring screw 30 and the first screw hole 16 of the attachment jig 10.

FIG. 6 is a flowchart showing the procedures in detail, steps S1 to S3 correspond to the temporary fixing step of 1), steps S4 to S6 correspond to the optical axis adjustment step of 2), and steps S7 to S8 correspond to the final fixing step of 3). Hereinafter, specific procedures will be described with reference to the flowchart of FIG. 6 and FIGS. 7 to 9.

In FIG. 6, first, an operator installs the vehicular camera 100 in the inspection jig 200 (step S1). As shown in FIG. 7, the inspection jig 200 is a flat plate-shaped member and includes a vehicular camera positioning portion 202, an attachment jig positioning portion 203, and an attachment jig fixing portion 204. As shown in FIG. 8, the vehicular camera positioning portion 202 is formed by a concave portion having a rectangular shape in a plan view, and two walls of the concave portion define reference planes P1 and P2. One reference plane may be used.

The operator installs the vehicular camera 100 in the inspection jig 200 in a state where the large-diameter tubular portion 161 of the housing 160 of the vehicular camera 100 is in contact with the reference planes P1 and P2. Accordingly, it is possible to easily and accurately position the vehicular camera 100 with respect to the inspection jig 200.

Next, the operator disposes the flat plate portion 42 of the thermosetting resin 40 such that a hollow portion in a center of the tube portion 44 coincides with the second screw hole 164 of the large-diameter tubular portion 161 of the vehicular camera 100, and installs the attachment jig 10 in the inspection jig 200 such that the tube portion 44 enters the first screw hole 16 of the attachment jig 10 (step S2). FIG. 7 shows a state in which two thermosetting resins 40 are disposed in opposite angles.

The operator can install the attachment jig 10 in the inspection jig 200 such that the positioning portion 19 of the attachment jig 10 is fitted to an outer peripheral frame of the attachment jig positioning portion 203 of the inspection jig 200. The attachment jig positioning portion 203 has a shape surrounded by the outer peripheral frame and the outer peripheral frame has a shape fitted to and coinciding with the positioning portion 19, and thus the attachment jig 10 can be easily positioned and installed with respect to the inspection jig 200. The operator further fixes the attachment jig 10 using the attachment jig fixing portion 204.

Next, the operator attaches the vehicular camera 100 and the attachment jig 10 using the spring screw 30 and temporarily fixes the vehicular camera 100 and the attachment jig 10 (step S3). In this example, since the thermosetting resin 40 is first disposed in the first screw hole 16 of the attachment jig 10, the operator inserts the shaft 34 of the spring screw 30 into the tube portion 44 of the thermosetting resin 40 and screws the shaft 34 into the second screw hole 164 of the vehicular camera 100 using a screwdriver. As a result, the temporary fixing step is finished, and the vehicular camera with the attachment jig 1 is installed in the inspection jig 200 as shown in FIG. 9.

In the present embodiment, the thermosetting resin 40 is provided as a solid component and is disposed at a predetermined position before being fixed by the spring screw 30. However, the thermosetting resin may be applied in a liquid state. For example, the operator may pour the thermosetting resin into the first screw hole 16 and applies the thermosetting resin after installing the vehicular camera 100 and the attachment jig 10 in the inspection jig 200. In addition, the operator may pour the thermosetting resin into the first screw hole 16 and applies the thermosetting resin after inserting the shaft 34 of the spring screw 30 into the first screw hole 16.

Next, as shown in FIG. 9, the operator disposes the inspection jig 200 on which the vehicular camera with the attachment jig 1 is installed so as to face a chart 300 and drives the vehicular camera 100 to direct the optical axis toward the chart 300 and capture an image (step S4). The chart 300 is imaged by the vehicular camera 100 whose optical axis is adjusted. When the vehicular camera 100 is attached to the attachment jig 10 in a correctly positioned state, the optical axis is imaged as being located at a coordinate center C, which is a normal position of the chart 300.

The operator confirms a position of the optical axis on the chart 300 and inspects the optical axis, that is, inspects whether the vehicular camera 100 is correctly positioned in the attachment jig 10 (step S5). As a result of inspecting the optical axis, when the positioning is not accurate and the optical axis is deviated from the coordinate center C and imaged (failed in step S5), the operator uses the screwdriver to turn the spring screw 30 and adjusts the optical axis of the vehicular camera 100, which is imaged on the chart 300, so as to coincide with the coordinate center C, which is the normal position (step S6). Since a relative relation between the vehicular camera 100 and the attachment jig 10 (an inclination and the like of the tow) is finely adjusted by rotating the spring screw 30, the optical axis can be moved. The operator repeats steps S5 and S6 until the optical axis coincides with the coordinate center C.

In this way, since the optical axis of the vehicular camera 100 is adjusted by turning the spring screw 30 while using the inspection jig 200 and the chart 300, the optical axis of the vehicular camera 100 can be easily and accurately adjusted. As a result, the vehicular camera 100 and the attachment jig 10 can be attached to the vehicle body with high positioning accuracy.

As a result of inspecting the optical axis, when the positioning becomes accurate and the optical axis coincides with the coordinate center C and is imaged (pass in step S5), the optical axis adjustment step is finished. Thereafter, the thermosetting resin 40 is irradiated with ultraviolet (UV) and is temporarily cured (step S7). The vehicular camera with the attachment jig 1 is placed in a constant temperature bath, the thermosetting resin 40 is finally thermally cured, and the vehicular camera with the attachment jig 1 is completed (step S8).

According to the manufacturing method in the present embodiment, since the vehicular camera 100 whose optical axis is adjusted in the optical axis adjustment step is fixed to the attachment jig 10 in the final fixing step by the thermosetting resin 40, the vehicular camera 100 and the attachment jig 10 can be attached with high positioning accuracy, and as a result, the vehicular camera 100 can be attached to the vehicle body with high positioning accuracy.

The thermosetting resin 40 is disposed in the first screw hole 16 of the attachment jig 10 in the temporary fixing step. Therefore, since the thermosetting resin 40 can be easily disposed, the vehicular camera 100 and the attachment jig 10 can be easily attached with high positioning accuracy.

Figure 10:
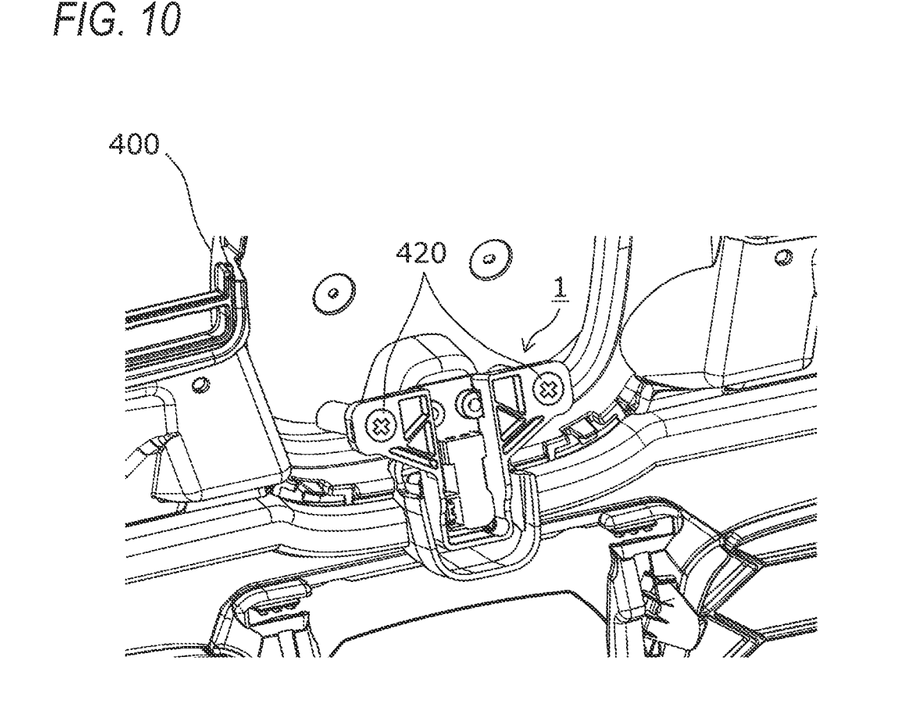
FIG. 10 is a diagram of a state in which the vehicular camera with the attachment jig is attached to a vehicle body, as viewed from the inside of the vehicle body.
Figure 11:
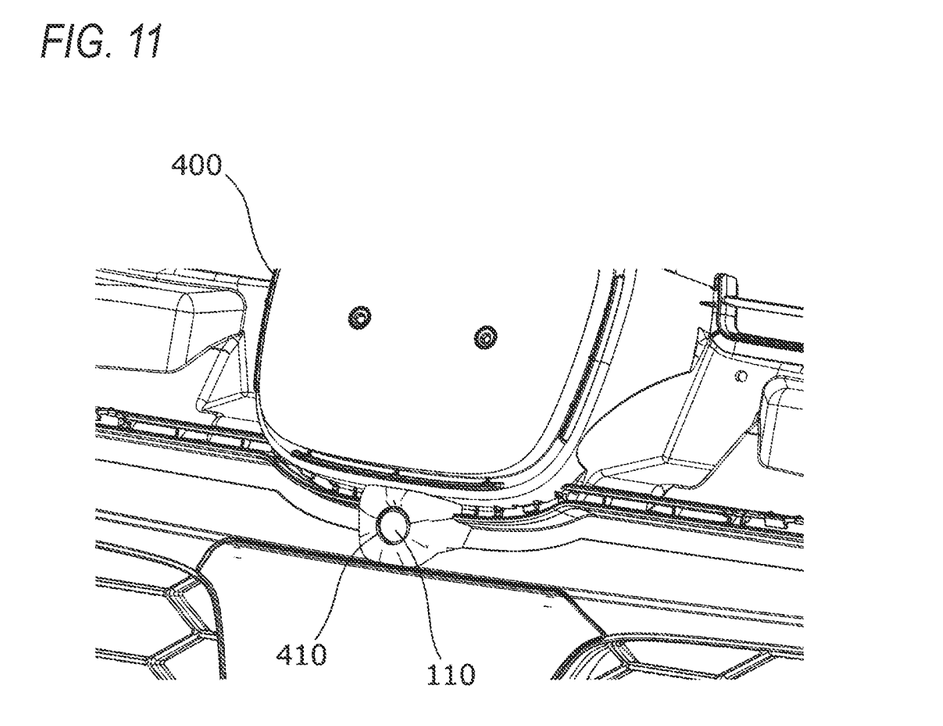
FIG. 11 is a diagram of a state in which the vehicular camera with the attachment jig is attached to the vehicle body, as viewed from the outside of the vehicle body.

FIG. 10 is a diagram of a state in which the vehicular camera with the attachment jig 1 is attached to a vehicle body 400, as viewed from the inside of the vehicle body. FIG. 11 is a diagram of a state in which the vehicular camera with the attachment jig 1 is attached to the vehicle body 400, as viewed from the outside of the vehicle body. As shown in FIG. 10, the vehicular camera with the attachment jig 1 is attached to the vehicle body 400 by an attachment screw 420 that passes through an attachment screw hole 11a of the attachment jig 10. As shown in FIG. 11, the lens 110 of the vehicular camera 100 is exposed outward through an exposure hole 410 provided in the vehicle body 400. Since the positioning accuracy of the vehicular camera 100 with respect to the attachment jig 10 and the vehicle body 400 is high, the vehicular camera 100 can capture an appropriate video without optical axis deviation. Since the positioning accuracy of the vehicular camera 100 is high, the lens 110 is exposed without deviating from the exposure hole 410, resulting in an excellent appearance.

As described above, at least the following matters are described in the present disclosure. In addition, although the parenthesis shows the components corresponding to the above-described embodiment, the present invention is not limited thereto.

(1) A vehicular camera with an attachment jig (vehicular camera with an attachment jig 1) including:
a vehicular camera (vehicular camera 100); and
an attachment jig (attachment jig 10) that attaches the vehicular camera to a vehicle body (vehicle body 400), in which
the attachment jig is provided with a first screw hole (first screw hole 16) through which a screw (spring screw 30) is able to pass,
the vehicular camera is provided with a second screw hole (second screw hole 164) into which the screw is able to be screwed,
the screw passes through the first screw hole and is screwed into the second screw hole, and
a thermosetting resin (thermosetting resin 40) is present in a gap (gap G) between the first screw hole and the screw so as to be in contact with both the first screw hole and the screw.

Accordingly, in the vehicular camera with the attachment jig, since the vehicular camera and the attachment jig are fixed to each other by the thermosetting resin, the vehicular camera and the attachment jig can be attached with high positioning accuracy, and as a result, the vehicular camera can be attached to the vehicle body with high positioning accuracy.

(2) In the vehicular camera with the attachment jig (vehicular camera with the attachment jig 1) according to (1), the screw is a spring screw (spring screw 30) having a spring (spring 38) in contact with a seating surface (seating surface 18) around the first screw hole.

Accordingly, in the vehicular camera with the attachment jig, since the spring of the spring screw absorbs a positional deviation after the vehicular camera is attached to the vehicle body, the high positioning accuracy of the vehicular camera can be maintained.

(3) In the vehicular camera with the attachment jig (vehicular camera with the attachment jig 1) according to (1), the thermosetting resin is present over the entire gap.

Accordingly, in the vehicular camera with the attachment jig, the vehicular camera and the attachment jig can be firmly fixed to each other, and the vehicular camera can be attached to the vehicle body with high positioning accuracy.

(4) In the vehicular camera with the attachment jig (vehicular camera with the attachment jig 1) according to (1), the thermosetting resin is in contact with a peripheral region (peripheral region 165) of the second screw hole.

Accordingly, in the vehicular camera with the attachment jig, the vehicular camera and the attachment jig can be more firmly fixed to each other, and the vehicular camera can be attached to the vehicle body with high positioning accuracy.

(5) In the vehicular camera with the attachment jig (vehicular camera with the attachment jig 1) according to (1), the attachment jig includes a positioning portion (positioning portion 19) that positions the attachment jig to an inspection jig (inspection jig 200) for adjusting an optical axis of the vehicular camera.

Accordingly, in the vehicular camera with the attachment jig, when the optical axis of the vehicular camera is adjusted, the attachment jig can be easily positioned and installed with respect to the inspection jig.

(6) A manufacturing method for a vehicular camera with an attachment jig, the method including:
a temporary fixing step of temporarily fixing, using a screw (spring screw 30), a vehicular camera (vehicular camera 100) to an attachment jig (attachment jig 10) for attaching the vehicular camera to a vehicle body (vehicle body 400);
an optical axis adjustment step of adjusting an optical axis of the vehicular camera to a normal position; and
a final fixing step of finally fixing the vehicular camera to the attachment jig by curing a thermosetting resin (thermosetting resin 40) provided so as to be in contact with at least both the screw and a screw hole (first screw hole 16) of the attachment jig.

Accordingly, in the manufacturing method for the vehicular camera with the attachment jig, since the vehicular camera whose optical axis is adjusted in the optical axis adjustment step is fixed to the attachment jig in the final fixing step by the thermosetting resin, the vehicular camera and the attachment jig can be attached with high positioning accuracy, and as a result, the vehicular camera can be attached to the vehicle body with high positioning accuracy.

(7) In the manufacturing method for the vehicular camera with the attachment jig according to (6), in the temporary fixing step, the vehicular camera and the attachment jig are installed in an inspection jig (inspection jig 200). In the optical axis adjustment step, an image is captured by the vehicular camera toward a chart (chart 300) facing the inspection jig, and the optical axis of the vehicular camera to be imaged on the chart is adjusted to the normal position while turning the screw.

In this way, in the manufacturing method for the vehicular camera with the attachment jig, since the optical axis of the vehicular camera is adjusted by turning the screw while using the inspection jig and the chart, the optical axis of the vehicular camera can be easily and accurately adjusted. As a result, the vehicular camera and the attachment jig can be attached to the vehicle body with high positioning accuracy.

(8) In the manufacturing method for the vehicular camera with the attachment jig according to (7), in the temporary fixing step, the vehicular camera and the attachment jig are installed in the inspection jig in a state in which the vehicular camera is in contact with a reference plane (reference planes P1 and P2) provided in the inspection jig.

Accordingly, in the manufacturing method for the vehicular camera with the attachment jig, it is possible to easily and accurately position the vehicular camera with respect to the inspection jig.

(9) In the manufacturing method for the vehicular camera with the attachment jig according to (6), the screw is a spring screw (spring screw 30) having a spring, and in the temporary fixing step, the spring is in contact with a seating surface (seating surface 18) around the screw hole.

Accordingly, in the manufacturing method for the vehicular camera with the attachment jig, since the spring of the spring screw absorbs the positional deviation after the vehicular camera is attached to the vehicle body, high positioning accuracy of the vehicular camera can be maintained.

(10) In the manufacturing method for the vehicular camera with the attachment jig according to (6), in the temporary fixing step, the thermosetting resin is disposed in the screw hole of the attachment jig.

Accordingly, in the manufacturing method for the vehicular camera with the attachment jig, since the thermosetting resin can be easily disposed, the vehicular camera and the attachment jig can be easily attached with high positioning accuracy.

Although the embodiment has been described above with reference to the accompanying drawings, the present disclosure is not limited to such an embodiment. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiments described above may be combined freely in a range without deviating from the spirit of the invention.

INDUSTRIAL APPLICABILITY

The present disclosure is useful as a vehicular camera with the attachment jig and a manufacturing method for the same in which the vehicular camera and the attachment jig are attached with high positioning accuracy, and as a result, the vehicular camera is attached to a vehicle body with high positioning accuracy.

What is claimed is:

1. A manufacturing method for a vehicular camera with an attachment jig, the method comprising:
   temporarily fixing, by using a screw, a vehicular camera to an attachment jig for attaching the vehicular camera to a vehicle body;
   adjusting an optical axis of the vehicular camera to a normal position; and
   finally fixing the vehicular camera to the attachment jig by curing a thermosetting resin provided so as to be in contact with at least both the screw and a screw hole of the attachment jig, wherein
   in the temporary fixing, the vehicular camera and the attachment jig are installed in an inspection jig in a state that the vehicular camera is in contact with a reference plane provided in the inspection jig, and
   in the optical axis adjustment, an image is captured by the vehicular camera toward a chart facing the inspection jig, and the optical axis of the vehicular camera to be imaged on the chart is adjusted to the normal position while turning the screw.

2. The manufacturing method for the vehicular camera with the attachment jig according to claim 1, wherein
   the screw is a spring screw having a spring, and
   in the temporary fixing, the spring is in contact with a seating surface around the screw hole.

3. The manufacturing method for the vehicular camera with the attachment jig according to claim 1, wherein
   in the temporary fixing, the thermosetting resin is disposed in the screw hole of the attachment jig.

* * * * *